July 23, 1968   P. E. BARNES   3,393,748
PROPELLER WITH SPRING ACTUATED VARIABLE PITCH
Filed July 22, 1966

INVENTOR
PHILIP E. BARNES
BY Norman Friedland
ATTORNEY

United States Patent Office 3,393,748
Patented July 23, 1968

3,393,748
PROPELLER WITH SPRING ACTUATED VARIABLE PITCH
Philip E. Barnes, North Granby, Conn., assignor to United Aircraft Corporation, East Hartford, Conn., a corporation of Delaware
Filed July 22, 1966, Ser. No. 567,183
8 Claims. (Cl. 170—160.32)

ABSTRACT OF THE DISCLOSURE

A propeller pitch actuating piston is loaded into and out of reverse and feather positions by a spring transmitting an axial load through a bellcrank and conically shaped cam extending axially along the axis of propeller rotation to give a different load for each axial position such that the load near reverse and feather is greater than the load intermediate thereof.

---

This invention relates to aeronautical variable pitch propellers of the type that are movable to feather and reverse positions.

In the field of lightweight, small, spring-actuated, pitch-changing propellers a problem existed where it was necessary to feather the propeller at a high specified flight velocity while the propeller lacked sufficient room to store enough spring energy. Additionally, maximum spring force was only required during two regimes of the blade angle range, namely, going out of reverse and approaching fully feather. Intermediate this range a relatively low energy spring device was sufficient. The use of a simple linear spring system was not possible since there was not sufficient room available to obtain the necessary energy in the limited area for the stroke of the spring. A dual spring system also was inadequate because of its complexity and additional weight.

Accordingly, I have found that I can obviate the problems noted above by providing a variable low stroke, high rate, high force, cam-actuated spring pack which provides the necessary force to urge the blades out of reverse and full feather while at the same time providing only the limited or minimum force necessary during the blade angle positions therebetween, thus providing an efficient use of the available energy.

Accordingly, this invention comprises a spring pack formed from a plurality of concentrically mounted disc type springs which axially load a spring seat and transmit this force through a flexible ring for producing a torque on a bellcrank which in turn loads a roller against a cam producing a variable axial load due to the cam slope. The cam, in turn, is connected to the pitch-changing piston connected to the propeller blades for varying blade angle. Thus, this system by being able to use the stored spring energy only where it is actually required results in a highly efficient spring system with considerable reduction in spring weight. This system also allows varying the output load with position over a wide range for varying propeller operating conditions by varying a cam contour. Additionally, the spring system provides this varying axial load from an axial spring system at a high efficient (ninety percent) cam-to-link system.

Other features and advantages will be apparent from the specification and claims and from the accompanying drawings which illustrate an embodiment of the invention.

Figure 1:
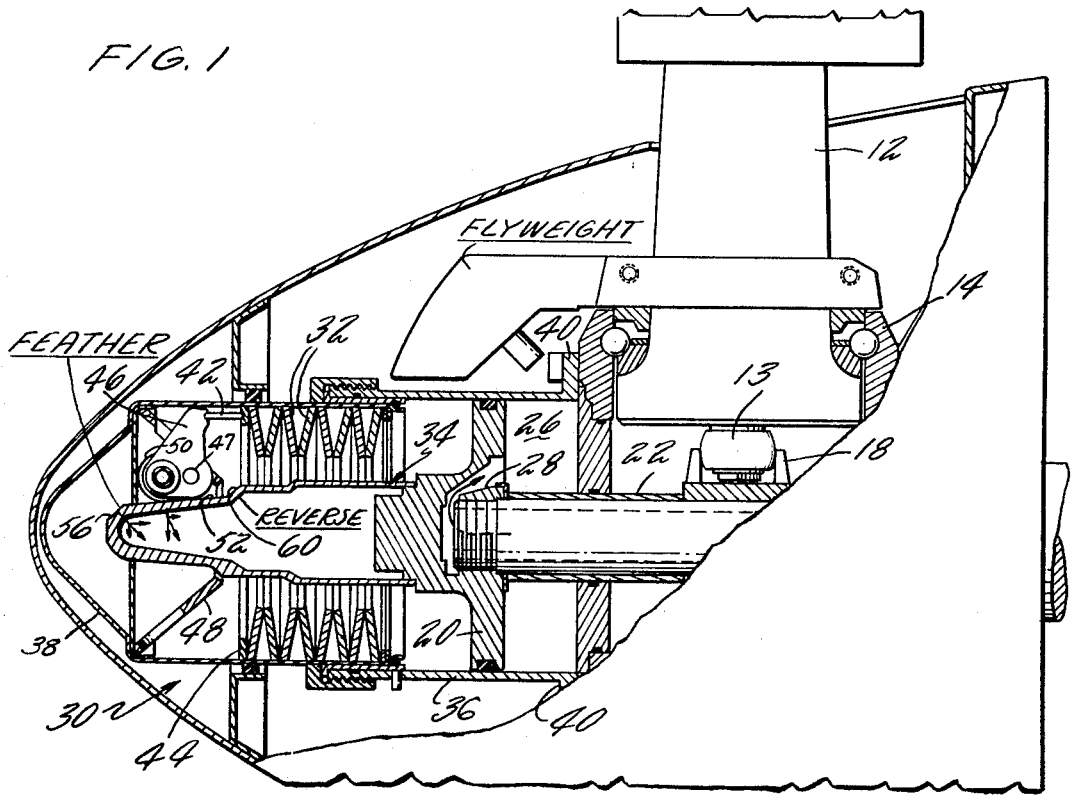
FIGURE 1 is a view partly in elevation and partly in section illustrating the preferred embodiment of the present invention.

Referring now particularly to FIG. 1 illustrating the details of the present invention in its most preferred embodiment wherein numeral 10 generally illustrates the propeller assembly but excluding the controlling mechanism generally associated with a variable pitch propeller. The control for the propeller is not deemed a part of this invention and for the sake of convenience is being omitted. The propeller blades (only one being shown) are circumferentially mounted about the periphery of the propeller and retained in hub 14 for pitch change movement. The hub is attached to the engine drive shaft in the conventional manner for being rotated about the propeller axis. Eccentric arm 13 carried on the base of propeller blade 12 extends radially inward toward the center of rotation of the propeller assembly and is connected to suitable yoke mechanism 18 which is attached to pitch-changing piston 20 by hollow shaft 22.

It is apparent from the foregoing that axial translation of piston 20 imparts rotary movement to propeller blade 14 about its longitudinal axis for varying the pitch thereof. Admission of high pressure fluid through hollow shaft 22 into chamber 26 via the drill passage 28 urges the piston to the left for advancing the propeller blades toward low pitch. Opposing this force is the force created by the counterweights and the spring pack assembly generally illustrated by numeral 30 which forms the important feature of this invention. While spring-loaded pitch actuators are in themselves old in the art, the specific spring assembly described hereinbelow is considered to be the advancement to the state of this art as will become apparent from the description to follow. It is pointed out here that the heretofore known spring assemblies are inadequate in this particular propeller because the space for retaining the customary spring is insufficient to provide the necessary energy required for the particular application of this propeller, namely high flight velocity aircraft. Hence according to this invention, suitable spring disc elements 32 are coaxially mounted within the dome assembly 36 extending forward of the hub 12 and suitably attached thereto by securing means mounted through flange 40 abutting the forward face of hub 12. The spring disc elements 32 are stacked axially and are characterized by having high rate and low stroke. Disc elements (Belleville springs) 32 are generally toroidal in shape having a central opening surrounding the axial cam element 34 and are loaded in the axial direction and disposed coaxially relative to the propeller's axis of rotation. Other spring energy storage devices may be used as well. The free end of the spring pack engages spring seat 42 which in turn is connected to the flexible ring element 44 which bears against the upper arm of bellcrank 46. Bellcrank 46 in turn is pivotally mounted on pivot 47 in fixed relation to the hub to suitable supporting bracket 48 mounted within dome casing 38. Preferably three such bellcranks circumferentially disposed about cam 34 are utilized while the number employed does not affect the scope of the invention. The opposite end of bellcrank 46 carries roller 50 which bears against the cam surface 52 of cam 34. It is apparent that when the load imposed by the spring-loaded roller 50 on cam 34 is resolved into its two component forces (horizontal and vertical), the magnitude and direction of the horizontal component will depend on the contour of the cam. If the tangent at the point of contact between roller and cam is parallel to the axis of the cam, there will be no horizontal component, and hence, no tendency to move cam 34 axially. Whenever the tangent through this point is angularly disposed to the centerline, then a horizontal component will be evident. Then the greater the angle, the larger the horizontal component force and hence the larger the resultant force in the axial direction.

Vectorially superimposed on FIG. 1 is the resultant and component forces showing the force behavior acting on cam 34 in the intermediate, feather and reverse ranges. This resultant force is then the force that is exerted against the hydraulic forces acting on the right-hand face of piston 20 by virtue of the pressure in chamber 26. Thus, in the position shown in the drawing, only a slight force is exerted on piston 20 and hence, only a light force in this direction is exerted against the roller and yoke mechanism for actuating the pitch change movement. This is sufficient force for proper operation in this blade angle range. When it is necessary to actuate and move the blade into the feather position, the fluid in chamber 26 is drained by the independent pitch control means, not shown, and the spring urges the piston to the right where high aerodynamic forces created by the forward velocity is attempting to keep the propeller toward a low pitch position. When the roller contacts the slope portion 56 of cam 34, a greater horizontal force will be evident and this force is sufficient to overcome the force generated by the blades and to advance them into feather position.

Similarly when the propeller is advanced toward the reverse position, the roller 50 engages slope 60 and imparts an additional load to piston 20 for overcoming the necessary forces which are generated by the loading on the propeller blades when advancing into or out of reverse.

Figure 2:
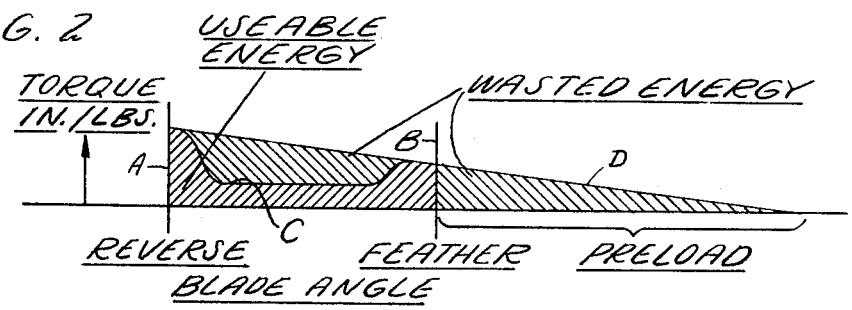
FIGURE 2 is a graphical illustration showing the desired usable energy necessary to position the blade to feather and reverse position and comparing a simple linear spring system with the present invention.

The operating regime of spring energy required can best be seen by referring to FIG. 2 which is a plot of blade angle position with respect to torque in inch pounds. The vertical line A represents the reverse blade angle position and the vertical line B represents the feather position. Line C represents the forces necessary during the entire regime. Curve D illustrates the simple linear spring system. From the graph it can be seen that the usable energy necessary to operate the pitch movement is bounded between reverse and feather by curve C. All the energy shown under curve D is unusable and hence, wasted energy.

Figure 3:
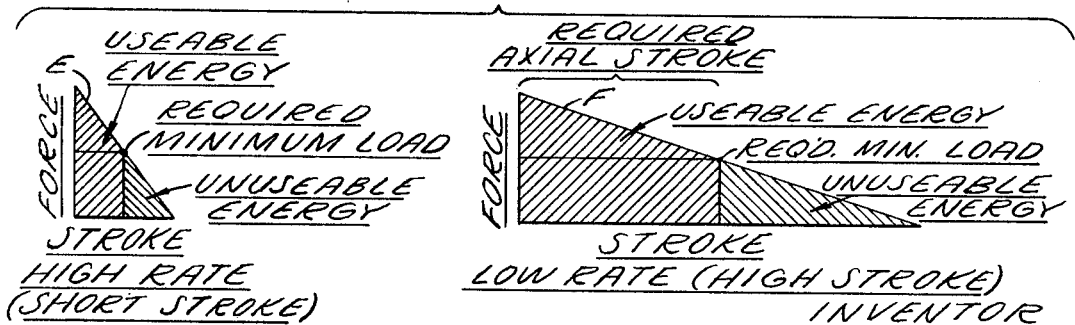
FIGURE 3 is a graphical illustration comparing the force versus stroke of the present invention and heretofore known spring systems.

FIGURE 3 is a graphical comparison of a plot of force versus stroke in a simple linear system and the system described in the present invention. Curve E illustrates the force versus stroke of the spring pack of the present invention and curve F indicates the force per stroke of the spring used in the heretofore simple spring systems. It is obvious from the comparison of the two graphs that the stroke provided by the present invention is short while providing a high spring rate, and the stroke of the heretofore known spring systems is comparatively high and having a low spring rate. Thus, it followed that this system provides a varying axial load from an axial spring system through a high (approximately ninety percent) efficient cam-to-link system and additionally allowing the output load to vary with position over a wide range for varying propeller operating conditions merely by varying the cam's contour and also providing a high spring force but yet obtaining a low weight spring in a minimum space.

It should be understood that the invention is not limited to the particular embodiments shown and described herein, but that various changes and modifications may be made without departing from the spirit or scope of this novel concept as defined by the following claims.

I claim:

1. Means for adjusting the pitch of the blades of an aeronautical propeller including a servo piston having a fluid expansion chamber on one end, the pressure in said chamber adapted to move the servo piston in one direction and adjust the pitch of the blade in a corresponding direction, resilient means acting on the other end of the servo piston tending to urge the pitch of the blades in an opposite direction, and cam means extending axially relative to the propeller axis of rotation connected intermediate said resilient means and said servo piston varying the axial load in a relatively highly energy conservative manner such the the load output increases at proximity to the minimum and maximum compressed load of the resilient means.

2. Pitch adjusting means as claimed in claim 1 wherein the pitch of the blades are movable into reverse and feather position and said resilient means and cam means imparting a high force in said reverse and feather positions relative to the force intermediate these pitch positions.

3. Pitch adjusting means as claimed in claim 1 wherein said resilient means includes a relatively low stroke, high rate spring.

4. Pitch adjusting means as claimed in claim 3 wherein said spring includes a plurality of individual toroidal shaped elements disposed about the axial centerline of the propeller.

5. Pitch adjusting means as claimed in claim 3 wherein said cam means include a generally conically shaped cam surface having its base abut against the servo piston, a pivotally mounted bellcrank having one arm bearing against the wall of said cam and mounted in sliding relation and the other arm operatively connected to said spring.

6. Pitch actuating means as claimed in claim 5 including a spring retainer mounted adjacent the free end of said spring and a flexible element interconnecting the other arm of said bellcrank and said spring retainer.

7. For an aeronautical propeller having a plurality of blades circumferentially mounted for pitch change movement and movable to reversing and feathering pitch positions and having independent control means for controlling the pitch of said blades in one direction, means independent of said control means for controlling the pitch in the opposite direction, said last-mentioned means including spring means coaxially mounted with the center of rotation of said propeller, a pivotally mounted bellcrank having one end attached to the free end of said spring means, a cam extending axially relative the center of rotation of said propeller connected to said pitch changing means, a roller following said cam mounted on the other end of said bellcrank and adapted to impart a resultant force at predetermined points on said cam surface for urging said blades into and out of the desired position so that a higher force is exerted at the reverse and feather range of the propeller.

8. Means for imparting an axial load to a member, said means including a spring fixed at one end, a bellcrank having one arm connected to the free end of said spring, a generally frusto-conically shaped cam extending along the axial centerline of said member intended to be loaded, the other arm of said bellcrank bearing against the surface of said frusto-conically shaped cam for varying the load for each position of the cam so that a higher axial load is imparted to the member intended to be loaded at both extremities of the position of the cam.

References Cited

UNITED STATES PATENTS

| Re. 25,096 | 12/1961 | Biermann | 170—160.32 |
| 2,492,653 | 12/1949 | Reek | 170—160.51 X |
| 3,273,656 | 9/1966 | Bird | 170—160.51 X |

FOREIGN PATENTS

| 452,625 | 8/1936 | Great Britain. |
| 534,529 | 3/1941 | Great Britain. |
| 340,848 | 5/1936 | Italy. |

EVERETTE A. POWELL, JR., *Primary Examiner.*